(12) United States Patent
Shimodaira

(10) Patent No.: US 8,044,980 B2
(45) Date of Patent: Oct. 25, 2011

(54) IMAGE DISPLAY

(75) Inventor: Yoshifumi Shimodaira, Hamamatsu (JP)

(73) Assignee: National University Corporation Shizuoka University, Shizuoka-shi (JP)

( * ) Notice: Subject to any disclaimer, the term of this patent is extended or adjusted under 35 U.S.C. 154(b) by 522 days.

(21) Appl. No.: 12/066,437

(22) PCT Filed: Sep. 12, 2006

(86) PCT No.: PCT/JP2006/318045
§ 371 (c)(1),
(2), (4) Date: Mar. 11, 2008

(87) PCT Pub. No.: WO2007/032336
PCT Pub. Date: Mar. 22, 2007

(65) Prior Publication Data
US 2009/0278862 A1 Nov. 12, 2009

(30) Foreign Application Priority Data

Sep. 12, 2005 (JP) ................................. 2005-264210

(51) Int. Cl.
*G09G 5/02* (2006.01)
(52) U.S. Cl. ....................................... 345/690; 345/590
(58) Field of Classification Search .................. 345/590, 345/690
See application file for complete search history.

(56) References Cited

U.S. PATENT DOCUMENTS

| | | | |
|---|---|---|---|
| 6,859,551 B2 * | 2/2005 | Ohga | 382/167 |
| 2004/0223005 A1 | 11/2004 | Lee | |
| 2005/0083341 A1 * | 4/2005 | Higgins et al. | 345/590 |
| 2005/0206979 A1 | 9/2005 | Tomizawa et al. | |
| 2005/0219274 A1 | 10/2005 | Yang et al. | |

FOREIGN PATENT DOCUMENTS

| | | |
|---|---|---|
| JP | 2001-209047 | 8/2001 |
| JP | 2004-286814 | 10/2004 |
| JP | 2004-295086 | 10/2004 |
| JP | 2005-196184 | 7/2005 |
| JP | 2005-303989 | 10/2005 |

OTHER PUBLICATIONS

International Search Report from corresponding PCT/JP2006/318045 dated Oct. 24, 2006.
Written Opinion from corresponding PCT/JP2006/318045 dated Oct. 24, 2006.

* cited by examiner

*Primary Examiner* — Quan-Zhen Wang
*Assistant Examiner* — Troy Dalrymple

(57) ABSTRACT

There is disclosed an image display displaying a multicolor image by using image data expressing color components of a first color specification system. The image display is provided with a display unit displaying an image by a second color specification system which is different from the first color specification system, and displaying each of colors included in the second color specification system per pixel in correspondence to input device data, a basic color computing unit (46) determining basic data expressing each of the color components in the second color specification system by using the input image data of the first color specification system, a specific color computing unit (48) determining specific data expressing each of color components in a third color specification system by using the input image data of the first color specification system, a combining unit (54, 56, 58) combining each of reference data of the base color computing unit and each of specific data of the specific color computing unit so as to determine combined data of each of the colors, and an output data computing unit (60) determining device data of each of the colors of the display unit on the basis of the combined data.

27 Claims, 10 Drawing Sheets

RELATION BETWEEN FILTER AREA AND COLOR GAMUT IN Yx PLANE

RELATION BETWEEN FILTER AREA AND COLOR GAMUT IN Yy PLANE

IMAGE DISPLAY

TECHNICAL FIELD

The present invention relates to an image display, and more particularly to an image display that displays an image with each of at least a predetermined red color, green color and blue color as reference colors.

BACKGROUND ART

When displaying a multicolor image, image display has generally been performed with each of a red color, a green color and a blue color as reference colors. In the image display mentioned above, when displaying a white color, the image display is carried out by exhibiting each of the red color, the green color and the blue color at a certain amount, but, there has been a case in which a reproducibility of the white color is not good in a combination of the three colors.

In order to dissolve this problem, there has been proposed an image display in which white color is added as the reference color to each of red, green and blue colors (for example, refer to Patent Document 1). In this technique, there has been proposed a four-color display displaying an image by using a white color luminance which is in proportion to a luminance of each of pixels of RGB and a luminance of the white color by itself.

Patent Document 1: Japanese Patent Application Laid-Open (JP-A) No. 2004-286814

DISCLOSURE OF THE INVENTION

Problem to be Solved by the Invention

However, thinking mainly about a white color component as a color, a good result may be obtained about the white color, however, it is insufficient to achieve a good color and an improvement of the luminance about the other colors.

Further, there is a case in which a desire of a user may not be satisfied by adjusting uniformly the image on the basis of the white color. For example, there is a case that the use desired a bright image even by scarifying somewhat of tint, or there is a case that the user desires a faithful tint image even by scarifying somewhat of brightness.

Accordingly, the invention provides an image display which may display a multicolor image by achieving a luminance improvement while maintaining a tint.

Further, the invention provides an image display which may display a multicolor image in such a manner as to be capable of adjusting a relation between the tint and the luminance.

Means for Solving the Problem

In accordance with one aspect of the invention, there is provided an image display displaying a multicolor image by using an image data expressing a color component of a first color specification system having each of predetermined red color, green color and blue color as a reference color, including: a display unit displaying an image on the basis of a second color specification system having each of a red color, green color and blue color which are from the first color specification system as reference colors, and displaying each of a white color, the red color, the green color and the blue color included in the second color specification system per pixel in correspondence to input device data; a basic color computing unit determining basic data expressing each of color components of the red color, the green color and the blue color in the second color specification system having each of the red color, the green color and the blue color of the display unit as the reference colors by using the input image data of the first color specification system; a specific color computing unit determining specific data expressing each of the color components of any two colors of the red color, the green color and the blue color of the display unit and a white color in a third color specification system having the two color and the white color as reference colors, by using the input image data of the first color specification system; a combining unit determining combined data of each of the white color, the red color, the green color and the blue color by combining each of reference data of the basic color computing unit, and each of specific data of the specific color computing unit with respect to the same color so as not to exceed the maximum luminance of the display unit; and an output data computing unit determining device data of each of the colors of the display unit on the basis of the combined data.

The other aspects and features and advantages of the invention will be apparent from the following description given in connection with the accompanying drawings.

Effect of the Invention

In accordance with the invention, since the same color is combined in such a manner as not to get over the maximum luminance of the display means, by determining the basic date expressing each of the color components of the red color, the green color and the blue color in the second color specification system of the display means corresponding to the input image data of the first color specification system by the basic color computing means, and determining the specific data expressing each of the color components in the third color specification system having any two colors of the red color, the green color and the blue color, and the white color as the reference colors by the specific color computing means, there is an effect that an improvement of the luminance may be achieved while maintaining the tint so as to display the multicolor image.

Further, since the basic data and the select data may be selectively combined, the multicolor image may be displayed in such a manner as to be capable of adjusting a relation between the tint and the luminance.

BEST MODE FOR CARRYING OUT THE INVENTION

A description will be in detail given below of a preferable exemplary embodiment of the present invention with reference to the accompanying drawings. The present exemplary embodiment is obtained by applying the invention to an image display in accordance with a projection optical system displaying an image by deflecting a light from a light source by a plurality of micro mirrors so as to project to a screen.

First, a description will be given of an image display in accordance with a first exemplary embodiment of the invention with reference to FIG. 1. In this case, the invention may be applied to the other image displays such as a liquid crystal display, a plasma display and the like, without being limited to the exemplary embodiment in FIG. 1.

Figure 1:
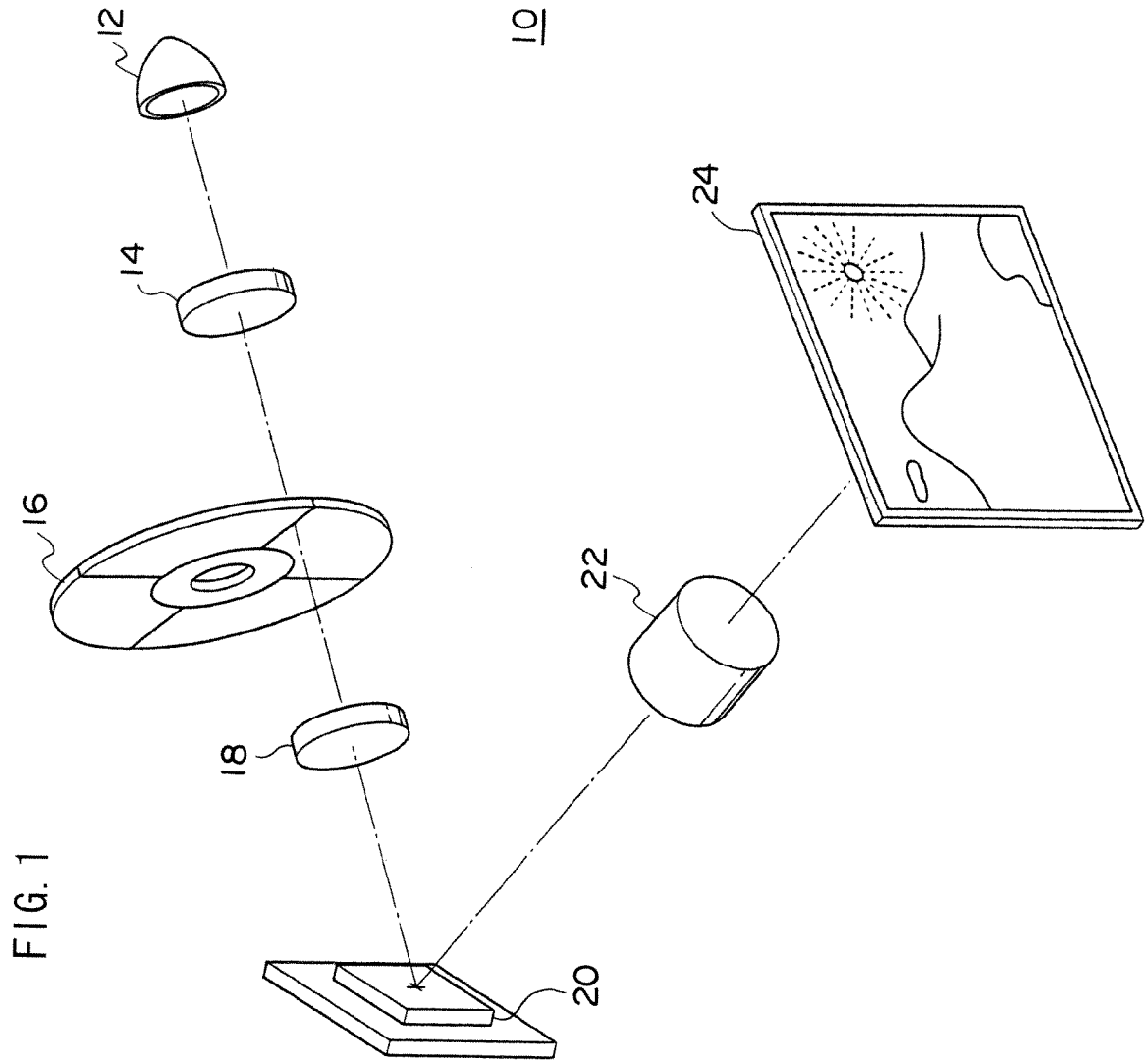
FIG. 1 is a perspective view showing an outline structure of an image display in accordance with an exemplary embodiment of the present invention.

As shown in FIG. 1, an image display 10 is provided with a light source 12, and a lens 14, a rotating filter 16 and a lens 18 are installed in turn in an output side of the light source 12. A spatial light modulating element 20 is installed in an output side of the lens 18. The spatial light modulating element 20 is structured such as to modulate an input light beam per each of pixels in correspondence to an image data, and employs a digital micro mirror device (DMD) in the present exemplary embodiment. A screen 24 is installed in a light modulation side outputting the light beam of the spatial light modulating element 20 via a projection lens 22.

The DMD employed as the spatial light modulating element 20 is structured such that a micro mirror is arranged on an SRAM cell (a memory cell) so as to be supported by a support column, and corresponds to a mirror device structured such that a lot of micro mirrors constructing pixels are arranged in a grid pattern. Each of the pixels is provided with the micro mirror supported by the support column in a topmost portion, and a material having a high reflection power such as an aluminum or the like is deposited on a surface of the micro mirror. In this case, the reflection power of the micro mirror is 90% or more. Further, the SRAM cell of CMOS of a silicon gate manufactured by a normal manufacturing line of a semiconductor memory is arranged just below the micro mirror via the support column including a hinge and a yoke, and a whole thereof is structured as a monolithic (an integral type).

Figure 2:
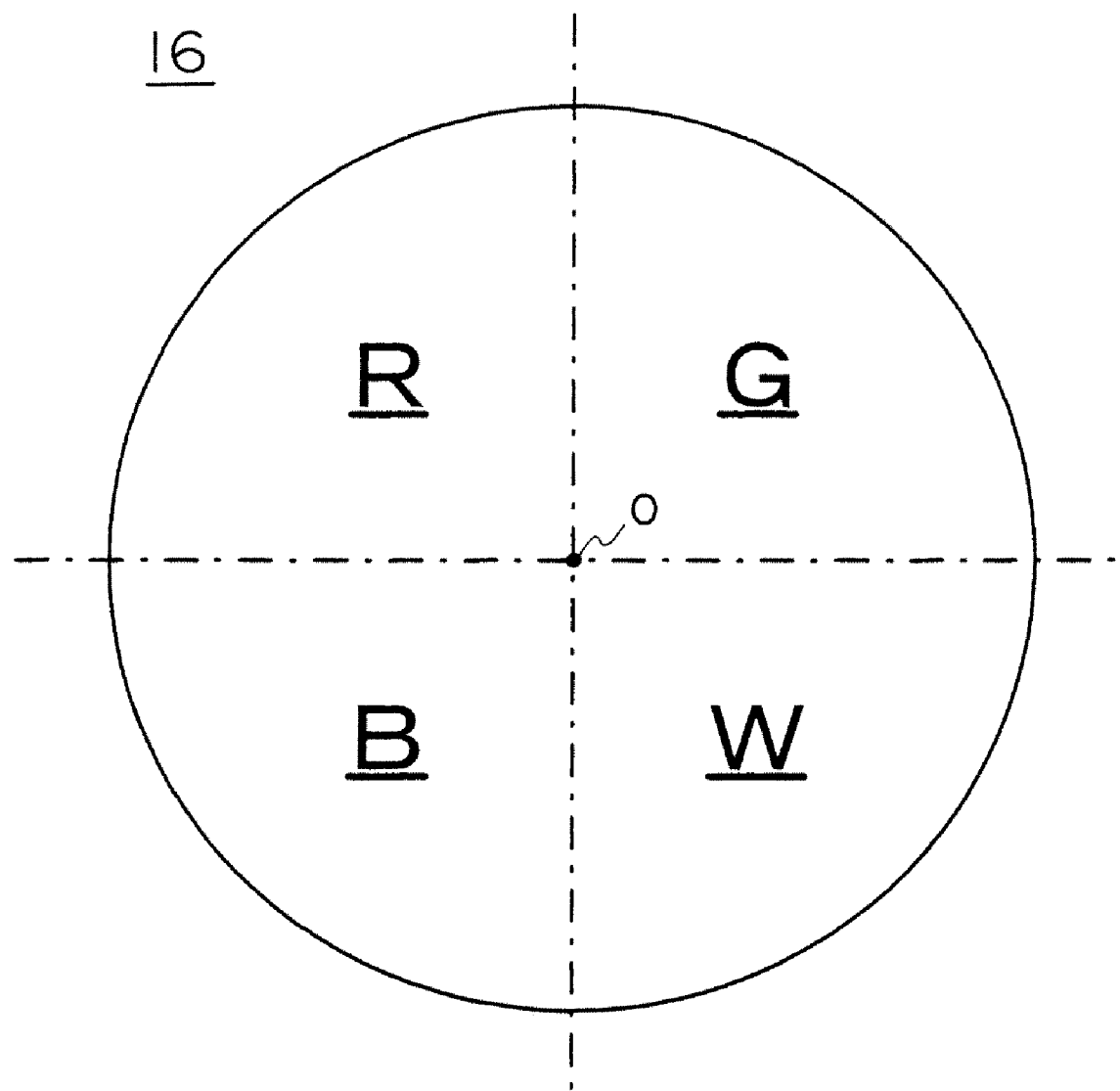
FIG. 2 is an image view showing an outline structure of a rotating filter used in the present exemplary embodiment.

As shown in FIG. 2, in the exemplary embodiment, the rotating filter 16 employs a four-segment color wheel having four color regions of a white color, a red color, a green color and a blue color. The rotating filter 16 is installed in the image display 10 in such a manner that an optical axis is positioned at a predetermined position (for example, a center portion or near an outer periphery) in a radial direction. A light beam of each of the white color, the red color, the green color and the blue color is irradiated to the spatial light modulating element 20 on the basis of a rotation of the rotating filter 16 around a center point O.

The rotating filter 16 in accordance with the present exemplary embodiment is formed in such a manner that the green color and the blue color are not in adjacent to each other in a positional relation of the color regions of the white color, the red color, the green color and the blue color. This is effective for suppressing a color mixture caused by the rotation of the green color filter and the blue color filter.

In this case, the rotating filter 16 and the spatial light modulating element 20 are connected to a control apparatus 30 (FIG. 3) mentioned below. The light modulation in the spatial light modulating element 20 is controlled, as well as the rotation of the rotating filter 16 is controlled on the basis of a signal from the control apparatus 30. The color of the light beam emitted from the rotating filter 16 is changed on the basis of the rotation of the rotating filter 16, and a light intensity of the light beam heading for the screen 24 from the spatial light modulating element 20 is changed on the basis of the control of the spatial light modulating element 20.

The control apparatus 30 generates a control signal controlling the rotating filter 16 in such a manner as to rotate at a fixed speed, and generates a control signal controlling a drive of each of the micro mirrors within the region to be controlled of the spatial light modulating element 20. Further, the control apparatus 30 rotationally controls the rotating filter 16 so as to come to a predetermined speed, and controls an angle of a reflection surface of each of the micro mirrors of each of the spatial light modulating elements 20, on the basis of the control signal of the image data.

In this case, the light source 12 employs the light source in which a wavelength distribution of a radiance is previously known, and the rotating filter 16 employs the rotating filter in which a spectral characteristic is measured per each of the color regions (the region of each of the white color, the red color, the green color and the blue color). Further, in the optical element which the light beam transmits and reflects until reaching the screen 24, that is, the lenses 14 and 18, the projection lens 22, and the spatial light modulating element 20, those in which the spectral characteristic is measured are employed. Accordingly, in the light beam output from the light source 12 and reaching the screen 24, the spectral characteristic has been already known per each of the color regions (the region of each of the white color, the red color, the green color and the blue color) of the rotating filter 16 within the control region of the spatial light modulating element 20.

Figure 3:
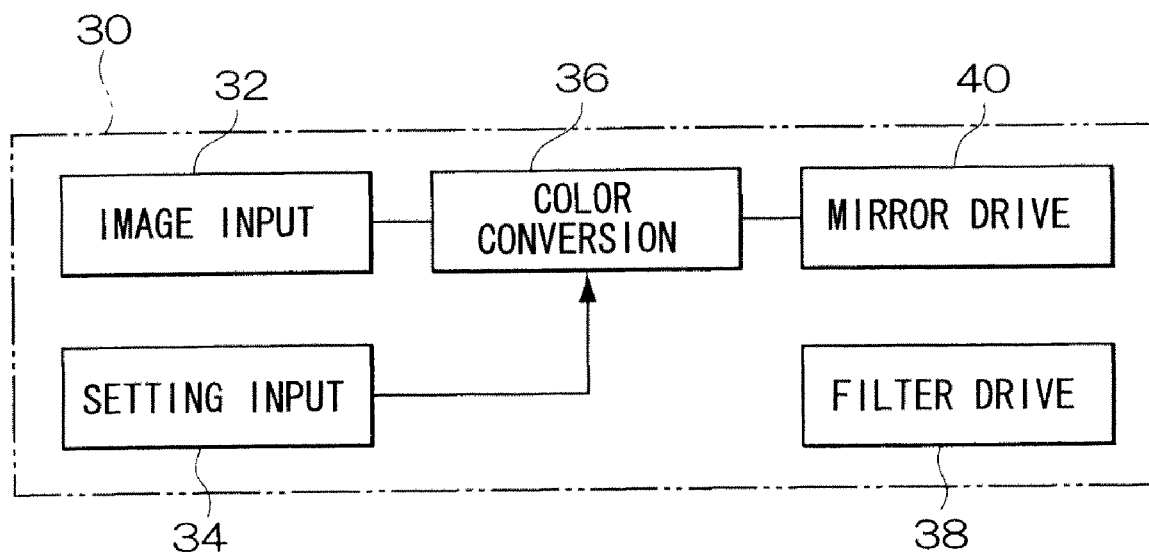
FIG. 3 is a block diagram showing an outline structure of a control apparatus in accordance with the present exemplary embodiment.

As shown in FIG. 3, the control apparatus 30 is structured by a computer, and is provided with an image input portion 32 inputting an image for a display, a setting input portion 34, a color converting portion 36, a filter drive portion 38 and a mirror drive portion 40, as a function portion thereof. The image input portion 32 is connected to the mirror drive portion 40 via the color converting portion 36, and displays an image on the screen 24 by the mirror drive portion 40 driving the spatial light modulating element 20 in correspondence to the image date output from the image input portion 32. The setting input portion 34 is also connected to the color converting portion 36, and is structured such that a set value for adjusting a tendency of a color conversion may be input in detail mentioned below. In this case, the filter drive portion 38 serves as a drive for rotationally controlling the rotating filter 16 at a fixed speed, in the present exemplary embodiment.

The image input portion 32 corresponds to an input converting portion capable of digitally treating the image in the image display 10. As an example of the image input portion 32, there is an interface apparatus which is provided with an interface connected to an external information terminal (for example, a computer), and inputs an image date output form the information terminal as an image for a display. As the other example, there is an image reading apparatus such as a scanner which reads an image of a manuscript so as to convert into a digital image date and output.

The color conversion portion 36 corresponds to a function portion (which is be in detail described below) faithfully reproducing the image data expressed by a color specification system of the external apparatus (of the information terminal or the image reading apparatus) and input from the image input portion 32, in the color specification system of the image display 10 in accordance with the present exemplary embodiment, or converting into the image date more improving a brightness. The image data output from the color converting portion 36 is output to the mirror drive portion 40. The mirror drive portion 40 corresponds to a driver for driving the spatial light modulating element 20.

Further, the setting input portion 34 is connected to the color converting portion 36. The setting input portion 34 is constituted by a switch or the like, and is provided for inputting a setting value for adjusting the tendency of the color conversion. For example, the setting input portion 34 may be constituted by a selector switch outputting a set value of a luminance priority providing an image more improving the brightness or a color priority providing an image faithfully expressing a color. It has a function of selecting a combination of colors in the case of changing the tendency of the color converting portion 36 on the basis of a luminance value of each of the colors in detail mentioned below.

In this case, in the present exemplary embodiment, a description will be given of a case that the set value is input by structuring the setting input portion 34 by the switch or the like, however, the set value may be stored in a memory and selected or input by an input apparatus such as a key board (not shown) or the like.

Figure 4:
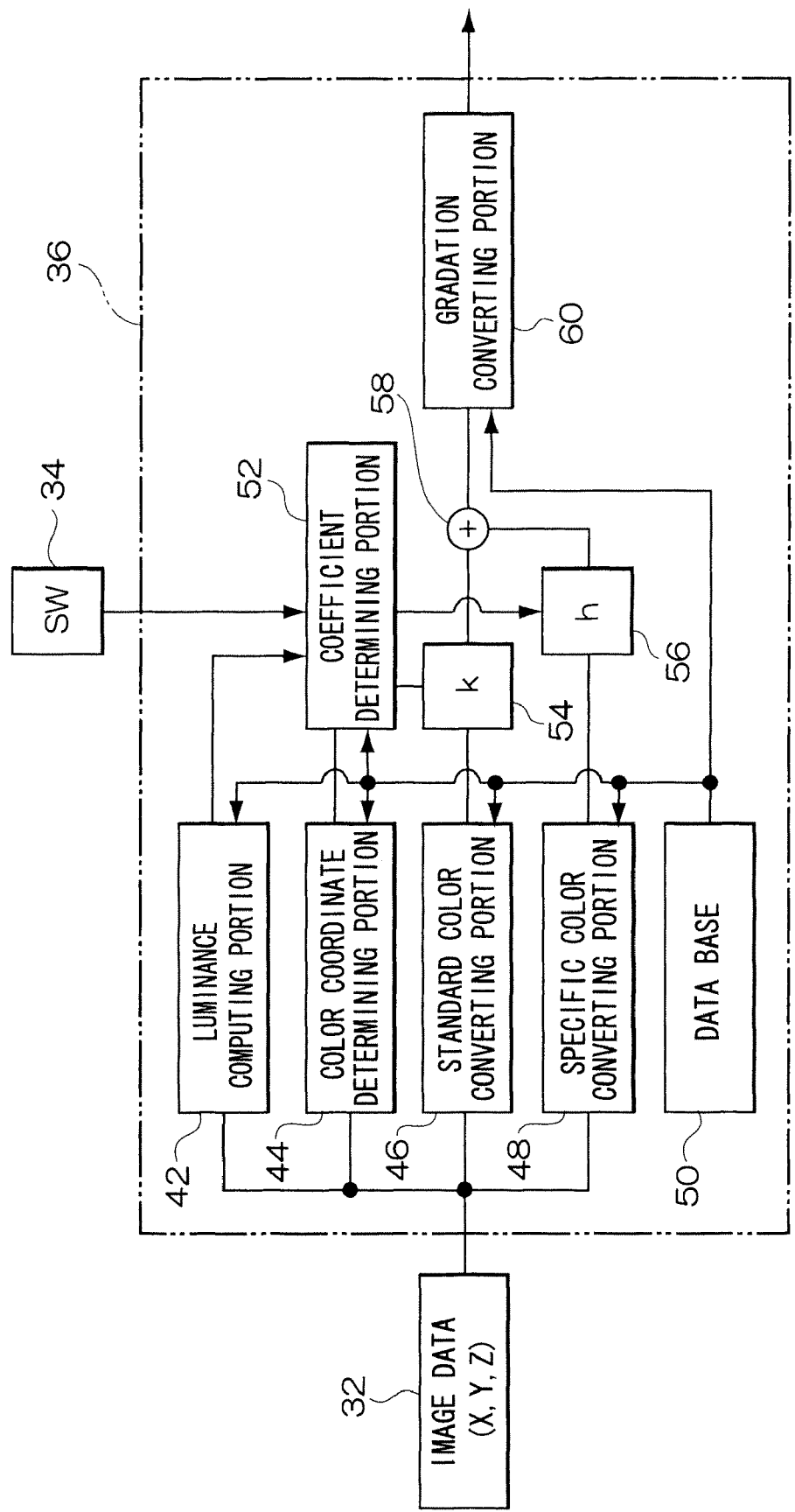
FIG. 4 is a block diagram showing an outline structure of a color conversion portion included in the control apparatus in accordance with a first exemplary embodiment.

As shown in FIG. 4, the color converting portion 36 is structured by including a luminance computing portion 42, a color coordinate determining portion 44, a standard color converting portion 46, a specific color converting portion 48, a data base 50, a coefficient determining portion 52, a k coefficient portion 54, an h coefficient portion 56, a combining portion 58 and a gradation converting portion 60.

The luminance computing portion 42, the color coordinate determining portion 44, the standard color converting portion 46 and the specific color converting portion 48 are connected in such a manner that the image data is input from the image input portion 32, and the luminance computing portion 42 and the color coordinate determining portion 44 are connected to an input side of the coefficient determining portion 52 in their output side. The connection is carried out in such a manner that the set value from the setting input portion 34 is input to the input side of the coefficient determining portion 52. An output side of the standard color converting portion 46 is connected to the combining portion 58 via the k coefficient portion 54. The k coefficient portion 54 outputs a data obtained by multiplying a value decided by the coefficient determining portion 52 by a coefficient k to the combining portion 58. An output side of the specific color converting portion 48 is connected to the combining portion 58 via the h coefficient portion 56. The h coefficient portion 56 outputs a data obtained by the value decided by the coefficient determining portion 52 by a coefficient h to the combining portion 58. The combining portion 58 is structured such as to combine the data from the standard color converting portion 46 and the data from the specific color converting portion 48, and its output side is connected to the gradation converting portion 60. The gradation converting portion 60 is structured such as to gradation convert the input data and output the gradation data to the mirror drive portion 40.

In this case, the luminance computing portion 42, the color coordinate determining portion 44, the standard color converting portion 46, the specific color converting portion 48, the coefficient determining portion 52 and the gradation converting portion 60 are connected to the data base 50 storing various data.

The standard color converting portion 46 corresponds to a function portion converting an input image data expressed by a color specification system, or color system, (a first color specification system, or first color system) of an external apparatus into an image data expressed by a color specification system, or color system (a second color specification system, or second color system) having three colors including a red color, a green color and a blue color as a reference color in the image display 10 in accordance with the present exemplary embodiment. In the present exemplary embodiment, a description will be given of a case that the first color specification system employs an XYZ color specification system expressed by a tristimulus value of XYZ, and the second color specification system employs an RGB color specification system expressed by a tristimulus value of three colors (RGB) including the red color, the green color and the blue color.

Figure 5:
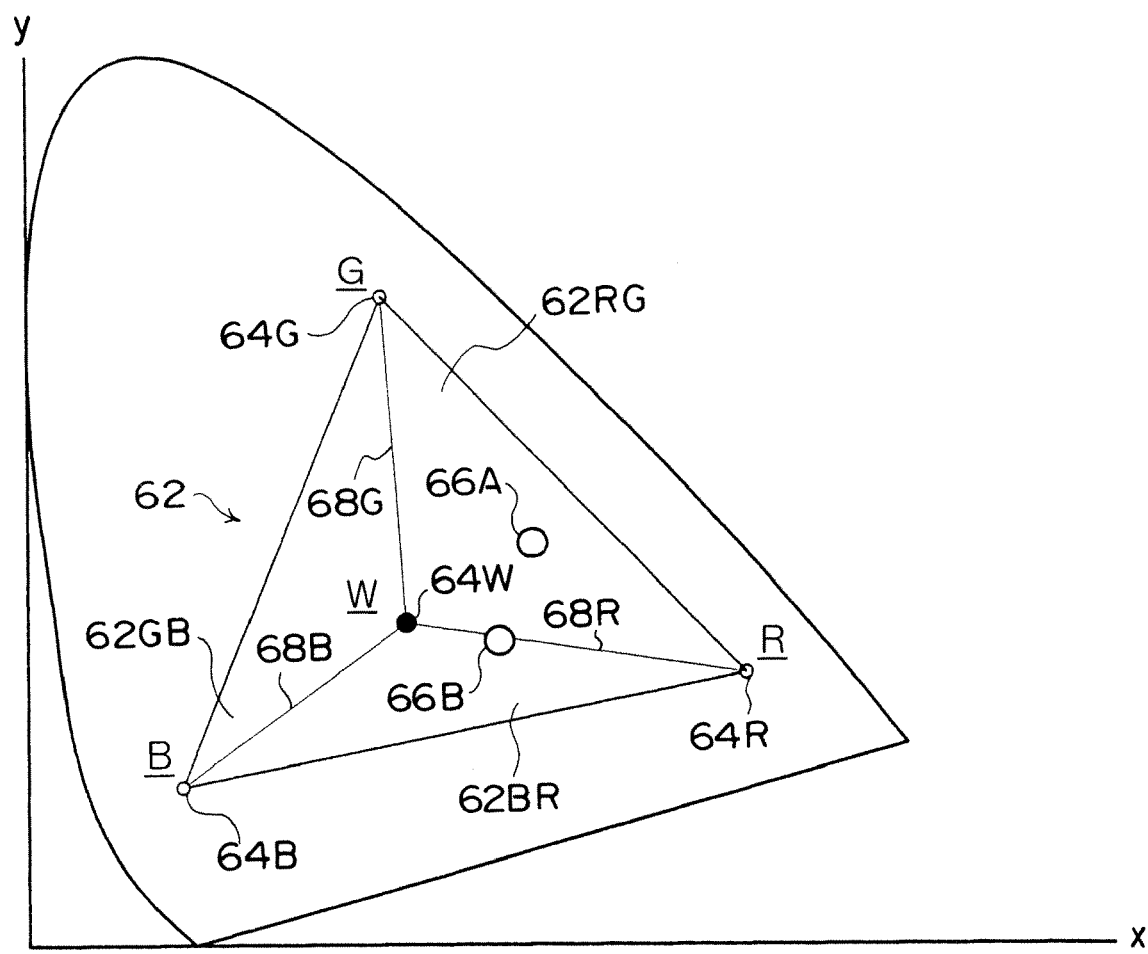
FIG. 5 is an explanatory view about a color space of a color specification system.

As shown in FIG. 5, the color specification system in this case means a color space which may be color expressed within a chromaticity diagram. For example, a bell-shaped space which may express all the colors (FIG. 5 is a region displaying a fixed brightness. In other words, a bell-shaped space of an xy chromaticity diagram corresponds to a space obtained by XYZ three-dimensionally displaying an equi-energy spectrum color light and projecting an intersecting point group between them and a unit surface (a surface including points (XYZ)=(100), (010) and (001)) onto the XY surface. In other words, the brightness information is not provided.) corresponds to the first color specification system, and the space on the basis of the tristimulus value of three colors (RGB) of the red color, the green color and the blue color included in an inner portion thereof (a color space 62 of a triangular region because FIG. 5 displays the fixed brightness) corresponds to the second color specification system.

The conversion from the first color specification system to the second color specification system may be calculated in accordance with the following formula (1). In other words, the color conversion is carried out by a matrix including the tristimulus value of RGB.

[Numerical Formula 1]

$$\begin{bmatrix} \text{linear\_rl} \\ \text{linear\_gl} \\ \text{linear\_b} \end{bmatrix} = \begin{bmatrix} X_R & X_G & X_B \\ Y_R & Y_G & Y_B \\ Z_R & Z_G & Z_B \end{bmatrix}^{-1} \begin{bmatrix} X \\ Y \\ Z \end{bmatrix} \quad (1)$$

In this case, X, Y and Z are image data input as one pixel within the image, and linear#r1, linear#g1 linear#b are output image data. Further, each of the values of the matrix is stored in the data base 50.

The specific color converting portion 48 corresponds to a function portion converting the input image data expressed by the color specification system (the first color specification system) of the external apparatus into an image data expressed by a color specification system obtained by departmentalizing the color specification system (the second color specification system) having three colors including the red color, the green color and the blue color as the reference color in the image display 10, that is, a color specification system (a third color specification system, or third color system) having three colors including two colors of the red color, the green color and the blue color and a white color as a reference color. In the present exemplary embodiment, a description will be given of a case that the third color specification system employs two colors of the red color, the green color and the blue color (any of RG, GB and BR) and the white color (W) as the third color specification system, however, the color is not limited to the white color (W), however may employ any color in an inner portion of the color space 62 of the second color specification system.

The third color specification system is constituted by any one of a triangular region color space 62RG based on color coordinates 64R and 64G of a tristimulus value of two colors (RG) including the red color and the green color, and a color coordinate 64W of a tristimulus value of the white color (W), a triangular region color space 62GB based on color coordinates 64G and 64B of a tristimulus value of two colors (GB) including the green color and the blue color, and the color coordinate 64W of the tristimulus value of the white color (W), and a triangular region color space 62BR based on color coordinates 64B and 64R of a tristimulus value of two colors (BR) including the blue color and the red color, and the color coordinate 64W of the tristimulus value of the white color (W), in a color coordinate system shown in FIG. 5.

A conversion from the first color specification system to the third color specification system of the color space 62RG may be calculated in accordance with the following formula (2). In other words, the color conversion is carried out in accordance with a matrix including the tristimulus value of RGW.

[Numerical Formula 2]

$$\begin{bmatrix} \text{linear\_r2} \\ \text{linear\_g2} \\ \text{linear\_w} \end{bmatrix} = \begin{bmatrix} X_R & X_G & X_W \\ Y_R & Y_G & Y_W \\ Z_R & Z_G & Z_W \end{bmatrix}^{-1} \begin{bmatrix} X \\ Y \\ Z \end{bmatrix} \quad (2)$$

In this case, linear#r2, linear#g2 linear#w are output image data. Further, each of the values of the matrix is stored in the data base 50.

In this case, since the other color spaces 62GB and 62BR are the same, a detailed description will be omitted.

The k coefficient portion 54, the h coefficient portion 56 and the combining portion 58 corresponds to a portion for combining the image data output from the standard color converting portion 46 and the specific color converting portion 48. In the k coefficient portion 54, the h coefficient portion 56 and the combining portion 58, the combined data linear#r, linear#g, linear#b and linear#w of the respective colors RGBW may be calculated in accordance with the following formula (3). In this case, the following formula (3) shows a case that the input image data is included within the color space 62RG, however, the other color spaces are the same.

[Numerical Formula 3]

$\text{linear\_r} = k \cdot \text{linear\_r1} + h \cdot \text{linear\_r2}$ $\text{linear\_g} = k \cdot \text{linear\_g1} + h \cdot \text{linear\_g2}$ $\text{linear\_b} = k \cdot \text{linear\_b}$ $\text{linear\_w} = h \cdot \text{linear\_w}$ (3)

In this case, k and h denote a coefficient.

The coefficient determining portion 52 corresponds to a function portion determining coefficient values of the k coefficient portion 54 and the h coefficient portion 56. The data is input to the coefficient determining portion 52 from the setting input portion 34, the luminance computing portion 42 and the color coordinate determining portion 44. The luminance computing portion 42 corresponds to a function portion computing the luminance of the input image data, and the color coordinate determining portion 44 corresponds to a function portion determining which of the color spaces 62RG, 62GB and 62BR the input image data is positioned. The coefficient determining portion 52 decides each of the coefficients from the input data. At a time of determining the coefficient by the coefficient determining portion 52, the value of the coefficient is adjusted in such a manner as to satisfy a determining condition shown by the following formula (4).

[Numerical Formula 4]

$0 \leq k \cdot \text{device\_r1} + h \cdot \text{device\_r2} \leq 1$ $0 \leq k \cdot \text{device\_g1} + h \cdot \text{device\_g2} \leq 1$ $0 \leq k \cdot \text{device\_b} \leq 1$ $0 \leq h \cdot \text{device\_w} \leq 1$ $k + h = 1$ (4)

In this case, device#r1, device#r2, device#g1, device#g2, device#b and device#w are values (for example, value between 0 and 1) obtained by standardizing a gradation data indicating the luminance of the pixel displayed in the image display 10, and the determining condition is adjusted so as to decide such a value that each of color values after a gradation conversion mentioned below does not get over a maximum luminance.

The gradation converting portion 60 is a function portion converting the input image data into the gradation data. In this gradation converting portion 60, gradation data device#r, device#g, device#b and device#w of the white color, the red color, the green color and the blue color corresponding to the reference colors in the image display 10 may be determined, in accordance with the following formula (5).

[Numerical Formula 5]

$\text{device\_r} = rF(\text{linear\_r})$ $\text{device\_g} = gF(\text{linear\_g})$ $\text{device\_b} = bF(\text{linear\_b})$ $\text{device\_w} = wF(\text{linear\_w})$ (5)

In this case, rF, gF, bF and wF are previously set gradation converting functions.

Figure 6:
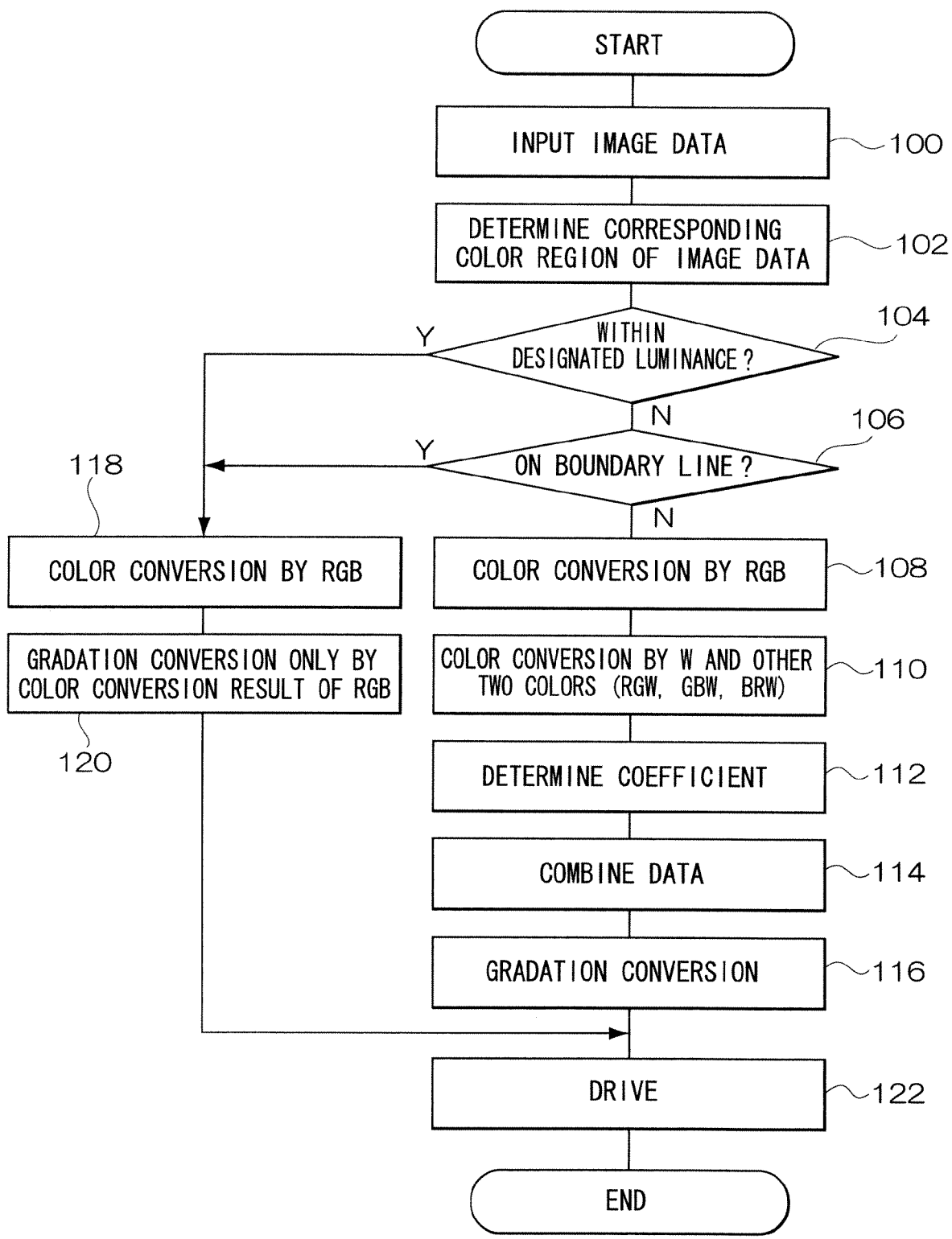
FIG. 6 is a flow chart showing a flow of a process in accordance with the first exemplary embodiment.

Next, a description will be given of an operation of the present exemplary embodiment. FIG. 6 shows a process of a treatment in the image display 10 in accordance with the present exemplary embodiment.

First, in a step 100, the image data is input to the image input portion 32. In the next step 102, the color space in which the color coordinate of the image data is positioned is determined in the color coordinate determining portion 44. For example, in the case that the image data is constituted by the color coordinate 66A as shown in FIG. 5, the color space 62RG is determined. In this step 102, the luminance value of the image data is calculated in the luminance computing portion 42. The luminance value is calculated per each of the red color, the green color and the blue color, or an average value thereof is determined.

In the next step 104, it is determined whether or not the calculated luminance value is within a previously designated luminance value. If it is affirmative, the step goes to a step 118, and if it is negative, the step goes to a step 106. This determination corresponds to a determination whether or not a white color component is added in correspondence to the luminance value, and is executed in the coefficient determining portion 52. In other words, since there is a case that a color reproducibility of the image is deteriorated by adding the white color component in the case that the luminance does not get over the fixed luminance, the luminance value at which the addition of the white color component is effective is previously designated.

In the step 106, it is determined whether or not the color coordinate of the image data is positioned in a boundary of the color spaces 62RG, 62GB and 62BR (on a line of any one of the boundary lines 68R, 68G and 68B in FIG. 5) or within a predetermined range (for example, at a position of the color coordinate 66B shown in FIG. 5). If it is affirmative, the step goes to the step 118, and if it is negative, the step goes to a step 108. This determination is necessary for a faithful color reproduction. In the case that the color coordinate of the image data exists on any line of the boundary lines 68R, 68G and 68B, it overstrides any two of the color spaces 62RG, 62GB and 62BR, and it is considered that the component of the color which is not included in the determined third color specification system affects. Accordingly, since it is not preferable in the case of displaying the faithful color, the present exemplary embodiment suppresses or inhibits the addition of the white color component, with regard to the image data on the boundary line or the predetermined range. An example in FIG. 6 shows a determination in the case of inhibiting, and in the case of suppressing, handling may be achieved by making a rate of the coefficient smaller, for example, at a fixed amount in the white color side.

In the step 108, in the standard color converting portion 46, the color conversion is carried out by the matrix constituted by the tristimulus value RGB, with regard to the image data, in the manner as mentioned above. In the next step 110, the color conversion is carried out in the manner mentioned above in correspondence to the color region of the color coordinate in which the image data is positioned in the specific color converting portion 48. For example, in the case that the image data is constituted by the color coordinate 66A, the color conversion is carried out by the matrix constituted by the tristimulus value RGW.

In the next step 112, the coordinate is decided in the coordinate determining portion 52, and is stored in the k coefficient portion 54 and the h coefficient portion 56. The coefficients k and h are decided in such a manner as to satisfy a determining condition shown by the formula (4) mentioned above. At a time of determining the rate of the coefficients k and h, a rate of the added white color component is first decided on the basis of the set value input from the setting input portion 34. Since the luminance is increased by adding the white color component because of the high luminance of the white color, there is a case that a pseudo profile in which a profile is enhanced is generated as the image. Accordingly, it is preferable that an increase of the white color component is not too much. However, it is expected to provide a bright image in which the luminance is increased, on the basis of the increase of the white color component. Therefore, the image having the faithful and bright color may be provided by adjusting an adding amount or a rate of the white color component.

Accordingly, in the present exemplary embodiment, the setting by the setting input portion 34 means a designation of the rate of the added white color component. In this case, it is preferable to set the rate to 0% in the case of the color priority mentioned above, and set the rate to a predetermined rate in the case of the luminance priority. Further, in the present exemplary embodiment, the increase in four steps 0%, 10%, 20% and 30% may be set. This is a knowledge obtained by the inventor of the invention on the basis of a result of experiment that the luminance of three primaries RGB and the luminance of the white color are approximately identical and the area and the luminance of the rotating filter 16 are approximately in a proportionality relation, as a result of an experiment that about 20% white color area is added to the RGB in the rotating filter 16 shown in FIG. 2. In other words, a tendency capable of improving the luminance may be selected in accordance with a mode adding 10% in the vicinity of 20% step by step (10% and 30%), and a mode capable of expressing faithfully the color may be set by adding 0%. The coefficient may be decided by turning back to the original.

In this case, the structure may be made such as to automatically select the mode from the luminance value of the image data without depending on the setting of the mode by the setting input portion 34. For example, the structure may be made such as to set a plurality of threshold values about the luminance, and set the setting mode in each of the ranges.

In the next step 114, the combining portion 58 adds the image data of the standard color converting portion 46 multiplied by the coefficient k, and the image data of the specific color converting portion 48 multiplied by the coefficient h, and the combined data of RGBW is obtained. The combined data is input to the gradation converting portion 60 and is gradation converted, and the spatial light modulating element 20 is driven by the mirror drive portion 40 in the next step 122 on the basis of the gradation data. The image is displayed on the screen 24 in the manner mentioned above.

On the other hand, in order to display the image without adding the white color component, in the step 118, the color conversion is carried out in the standard color converting portion 46 in the same manner as the step 108 mentioned above, and in the next step 120, the gradation conversion is carried out in the gradation converting portion 60 on the basis of the data obtained only by the color conversion result in the step 118, and the spatial light modulating element 20 is driven by the mirror drive portion 40 on the basis of the gradation data (a step 122). In this step 120, the structure may be made such that the coefficient determining portion 52 decides the k coefficient portion 54 and the h coefficient portion 56 in such a manner that the output value of the standard color converting portion 46 is output as it is to the gradation converting portion 60.

Figure 7:
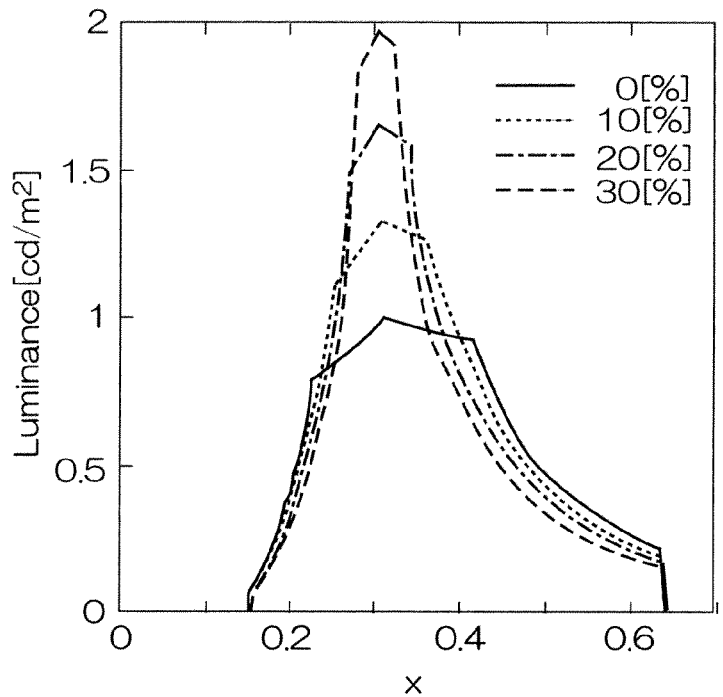
FIG. 7 is a characteristic view showing a relation between a white color area (rate) and a color gamut of the rotating filter, and a luminance in a plane Yx.
Figure 8:
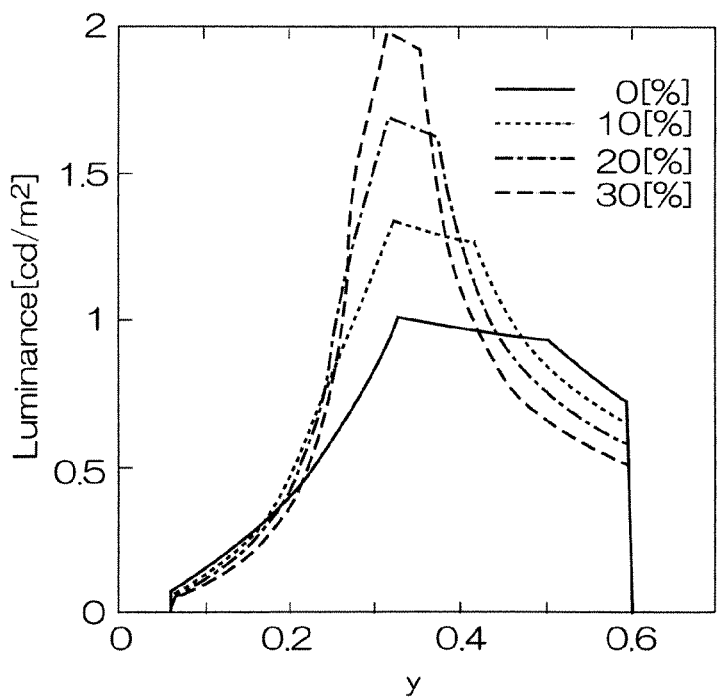
FIG. 8 is a characteristic view showing a relation between a white color area (rate) and a color gamut of the rotating filter, and a luminance in a plane Yy.

FIGS. 7 and 8 show a relation of a filter area and a color gamut at a time of displaying the image by the image display 10 in accordance with the present exemplary embodiment. The filter area in this case means an area of the white color added to the RGB in the rotating filter 16 mentioned above, and corresponds to the mode by the set value input by the setting input portion 34 in the image display 10. As is understood from the drawing, the luminance is increased without widely changing the profile of the color. In other words, in accordance with the image display 10 of the present exemplary embodiment, it is understood that the brightness is improved while faithfully expressing the color.

As mentioned above, in accordance with the present exemplary embodiment, the image data expressed by the color specification system (the first color specification system) of the external apparatus is converted into the image data of the color specification system (the second color specification system) having three colors including the red color, the green color and the blue color as the reference color in the standard color converting portion 46, is converted into the image date of the color specification system (the third color specification system) having three colors including two of the red color, the green color and the blue color and the white color as the reference color in the specific color converting portion 48, and is thereafter combined at the predetermined rate. In other words, the same color is expressed by the image data of two kinds of different color specification systems so as to be combined. Accordingly, since the component including the white color (W) is increased, the image in which the brightness is improved may be displayed.

Further, since the white color is increased at a time when the luminance value determined by the luminance computing portion 42 gets over the predetermined value, the pseudo profile may be suppressed and the image in which the brightness is intensified in correspondence to the brightness degree of the image may be provided. Further, since the white color is increased at a time when the position of the color coordinate determined by the color coordinate determining portion 44 is not positioned in the boundary of the color spaces 62RG, 62GB and 62BR, the color generated by the basic color space 62(RGB) with regard to the color overstriding two color spaces may be expressed. Accordingly, the faithful color may be displayed.

In this case, the description is given of the case that the addition of the white color component is suppressed or inhibited in the image data on the boundary line or within the predetermined range, however, the invention is not limited to this. For example, in the case of the color overstriding two color spaces, the color reproduction may be carried out on the basis of the tristimulus value of the color coordinates in both ends of the boundary line. For example, in the case of the color at the position of the color coordinate 66B shown in FIG. 5, the color may be reproduced by the rate of the tristimulus values of RW. In other words, the color may be reproduced on the basis of the color coordinate 64R of the tristimulus value of the red color and the color coordinate 64W of the tristimulus value of the white color (W).

Next, a description will be given of an image display in accordance with a second exemplary embodiment of the invention. In this case, in the first exemplary embodiment mentioned above, the description is given of the case that the image data is color converted individually per the pixel, however, the present exemplary embodiment is structured such as to color convert on the basis of divided regions obtained by dividing the image into a plurality of regions. In this case, since the present exemplary embodiment has approximately the same structure as the first exemplary embodiment mentioned above, the same reference numerals are attached to the same portions, and a detailed description thereof will be omitted.

In the present exemplary embodiment, an image data group constituted by a plurality of image data forming an image is temporarily stored in an image memory and a process is executed by using the image data group. Accordingly, the image input portion 32 is constituted by an image memory 70 for storing the image data group, and an image data portion 72 extracting an image data of a pixel from the image memory 70.

Figure 9:
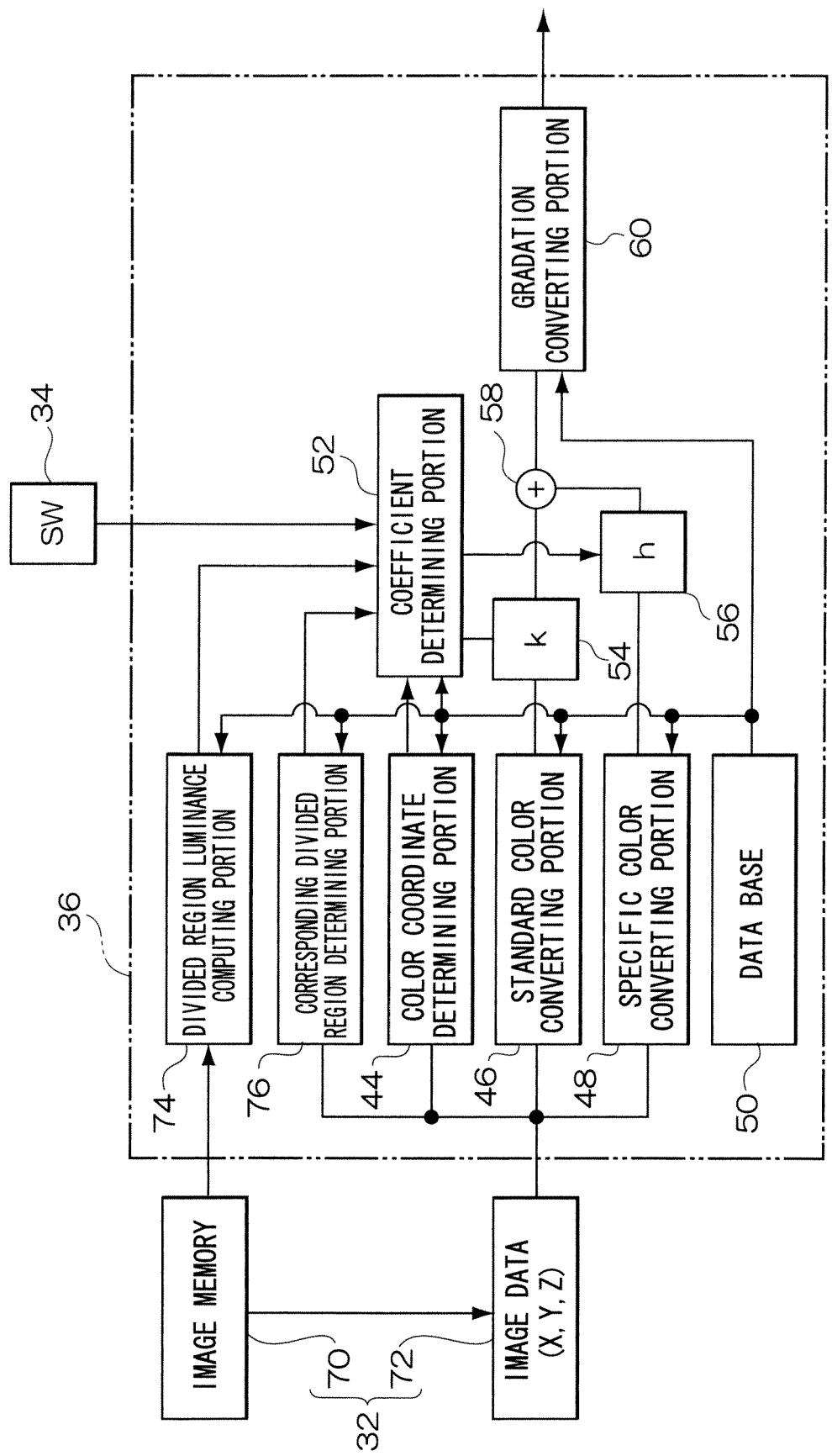
FIG. 9 is a block diagram showing an outline structure of a color conversion portion included in the control apparatus in accordance with a second exemplary embodiment.

As shown in FIG. 9, the color converting portion 36 in accordance with the present exemplary embodiment is structured such as to include a divided region luminance computing portion 74, a corresponding divided region determining portion 76, the color coordinate determining portion 44, the standard color converting portion 46, the specific color converting portion 48, the data base 50, the coefficient determining portion 52, the k coefficient portion 54, the h coefficient portion 56, the combining portion 58 and the gradation converting portion 60.

The divided region luminance computing portion 74 is connected in such a manner that the image data group constituted by a plurality of image data forming the image is input thereto from the image memory 70 of the image input portion 32. The corresponding divided region determining portion 76 is connected in such a manner that the image data is input thereto from the image data portion 72 of the image input portion 32. The input side of the coefficient determining portion 52 is connected to an output side of the divided region luminance computing portion 74 and the corresponding divided region determining portion 76 in place of the luminance computing portion 42 in the exemplary embodiment mentioned above. In this case, the divided region luminance computing portion 74 and the corresponding divided region determining portion 76 are connected to the data base 50 in which the various data is stored.

The divided region luminance computing portion 74 is a function portion determining an average luminance per a divided region obtained by vertically and horizontally dividing the image formed by the image data group constituted by a plurality of image data into a plurality of regions. The corresponding divided region determining portion 76 is a function portion determining which of the divided regions mentioned above one pixel included in the image corresponds.

Figure 10:
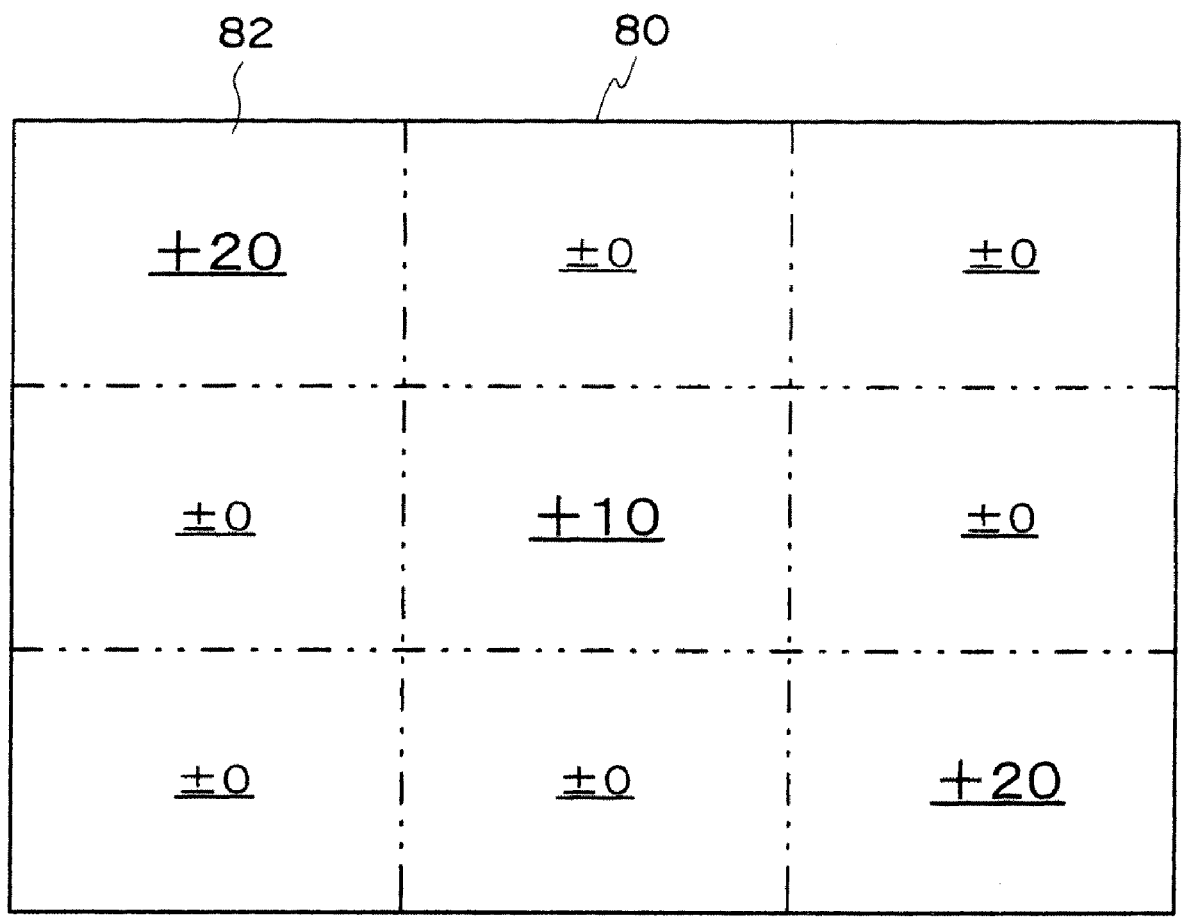
FIG. 10 is an explanatory view of a divided region treating by dividing an image in accordance with the second exemplary embodiment.

FIG. 10 shows one example that an image 80 is constructed by divided regions 82 obtained by dividing the image 80 into three rows and three lines. The divided region luminance computing portion 74 determines an average luminance per the divided region 82 in the image 80, and the corresponding divided region determining portion 76 determines which of the divided regions 82 within the image 80 the subject pixel is included.

Figure 11:
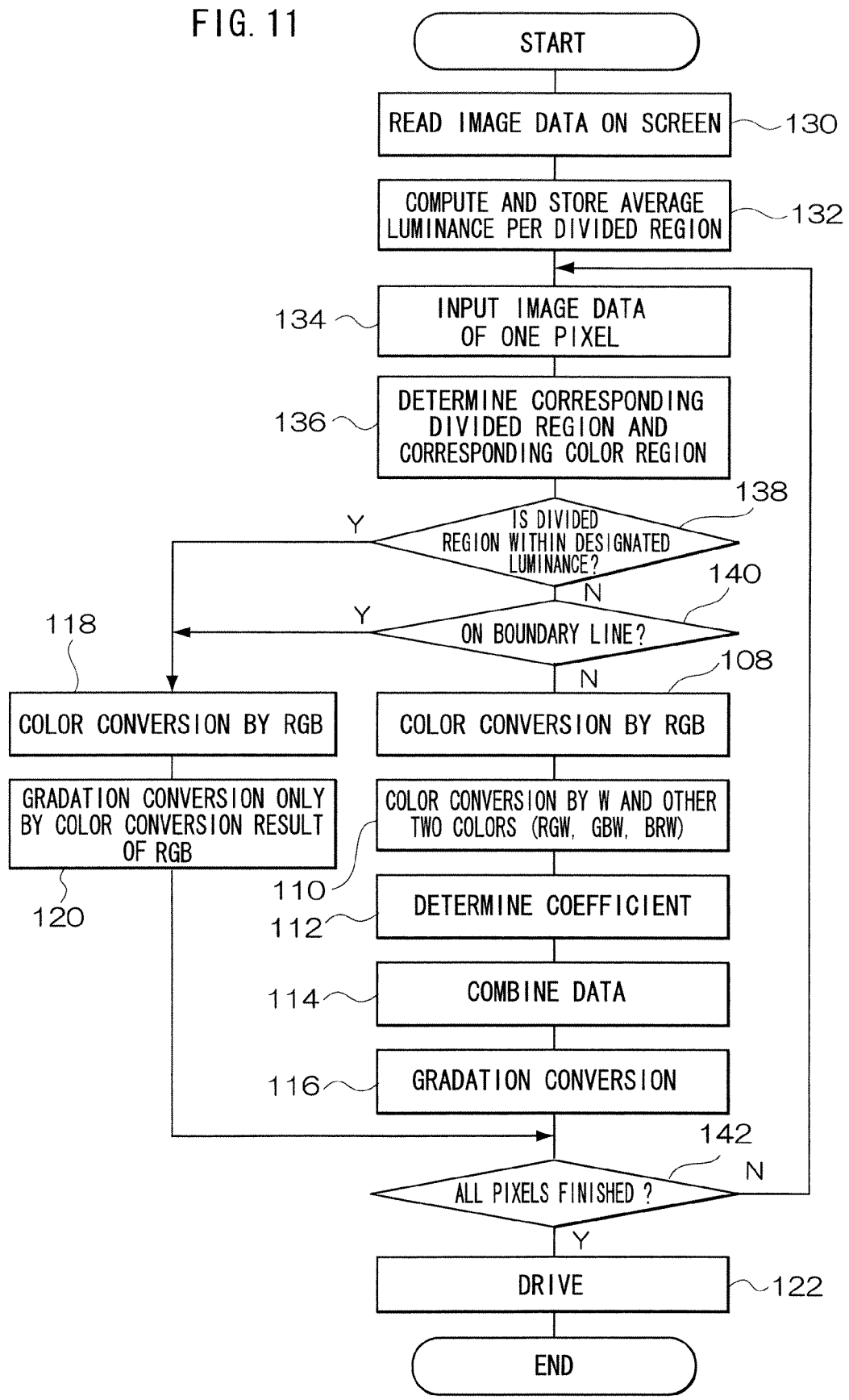
FIG. 11 is a flow chart showing a flow of a process in accordance with the second exemplary embodiment.

Next, a description will be given of an operation of the present exemplary embodiment. FIG. 11 shows a process of a treatment in the image display 10 in accordance with the present exemplary embodiment.

First, in a step 130, the image data group constituted by a plurality of image data forming the image is input to the image input portion 32, and in the next step 132, the image data group is read from the image memory 70 in the divided region luminance computing portion 74 and the average luminance of a plurality of image data included in the divided region 82 is determined per the divided region 82 of the image 80 so as to be stored. In the next step 134, the image data of one pixel in the image 80 is read from the image date portion 72, and the next step 136 determines the divided region 82 in which the image data of the read one pixel is included, and determines a color space in which a color coordinate of the image data is positioned.

The next step 138 determines whether or not the average luminance (the result of calculation of the step 132) of the corresponding divided region 82 of the image data read in the step 134 mentioned above, and the step goes to the step 118 if it is affirmative, and goes to a step 140 if it is negative. This determination corresponds to a determination whether or not the white color component is added in correspondence to the average luminance value of the divided region 82 with regard to the pixel within the divided region 82, and is executed in the coefficient determining portion 52.

In the step 140, it is determined in the same manner as the step 106 mentioned above whether or not the color coordinate of the image data is positioned in the boundary of the color spaces 62RG, 62GB and 62BR (on any line of the boundary lines 68R, 68G and 68B in FIG. 5) or within the predetermined range (for example, at a position of the color coordinate 66B shown in FIG. 5). The step goes to the step 118 if it is affirmative, and goes to the step 108 if it is negative.

If the step 140 is negative, there are carried out the color conversion by the RGB in the standard color converting portion 46 (the step 108), and the color conversion (for example, the color conversion by the matrix constituted by the tristimulus value of RGW) by the white color and two colors of the RGB in the specific color converting portion 48, the coefficients k and h are decided in the coefficient determining portion 52, and the gradient converting portion 60 gradient converts the combined data of RGBW obtained by combining the image data of the standard color converting portion 46 and the image data of the specific color converting portion 48 by the combining portion 58 (the steps 108 to 116).

FIG. 10 shows a rate of the white color component added per each of the divided regions 82. In the example in FIG. 10, the rate of the white color component, that is, the set mode mentioned above is defined in accordance with the luminance value of the image data.

In the next step 142, it is determined whether or not the process mentioned above is finished in all the pixels within the image 80, the step goes back to the step 134 if it is negative, and if it is affirmative, the step 122 drives the spatial light modulating element 20 by the mirror drive portion 40 on the basis of the gradation data of the step 116.

On the other hand, in the case that the white color component is not added, the color conversion is carried out in the standard color converting portion 46, and the gradation is converted in the gradation converting portion 60 (the steps 118 and 120).

As mentioned above, in accordance with the present exemplary embodiment, since the step determines per the divided region 82 of the image 80 not carrying out the process of adding the white color per the pixel, a process load may be lightened. Further, since the white color component may be increased and decreased per the divided region 82, the luminance may be adjusted in increments of the divided region 82 with regard to the displayed image, and a grain feeling of the image may be suppressed.

In this case, in the exemplary embodiment mentioned above, the image display 10 is constructed from the light source to the screen, however, these elements may be independently constructed. Further, the description is given on the assumption that the color converting portion 36 corresponding to the main portion of the present exemplary embodiment is constituted by one apparatus, however, the function portions may be structured as the independent structures and may be divided and connected.

Description of Reference Numerals

| | |
|---|---|
| 10 | image display |
| 12 | light source |
| 16 | rotating filter |
| 20 | spatial light modulating element |
| 24 | screen |

-continued

Description of Reference Numerals

| | |
|---|---|
| 30 | control apparatus |
| 32 | image input portion |
| 34 | setting input portion |
| 36 | color converting portion |
| 38 | filter drive portion |
| 40 | mirror drive portion |
| 42 | luminance computing portion |
| 44 | color coordinate determining portion |
| 46 | standard color converting portion |
| 48 | specific color converting portion |
| 50 | data base |
| 52 | coefficient determining portion |
| 54 | k coefficient portion |
| 56 | h coefficient portion |
| 58 | combining portion |
| 60 | gradation converting portion |

What is claimed is:

1. An image display displaying a multicolor image by using image data expressing color components of a first color system comprising predetermined colors as reference colors, comprising:

a display unit displaying an image on the basis of a second color system comprising each of a red color, green color and blue color which are different from said first color system as reference colors, and displaying each of a white color, the red color, the green color and the blue color included in said second color system per pixel in correspondence to input device data;

a basic color computing unit determining basic data expressing each of color components of the red color, the green color and the blue color in the second color system comprising each of the red color, the green color and the blue color of said display unit as the reference colors by using the input image data of the first color system;

a specific color computing unit determining specific data expressing each of the color components of any two colors of the red color, the green color and the blue color of said display unit and a white color in a third color system comprising said two color and the white color as reference colors, by using the input image data of the first color system;

a combining unit determining combined data of each of the white color, the red color, the green color and the blue color by combining each of basic data of said basic color computing unit, and each of the specific data of said specific color computing unit with respect to the same color so as not to exceed the maximum luminance of said display unit; and an output data computing unit determining device data of each of the colors of said display unit on the basis of said combined data, wherein the combining unit includes an adding unit adding reference data of said basic color computing unit and the specific data of said specific color computing unit per each color at a predetermined rate, and a determining unit determining said predetermined rate.

2. The image display of claim 1, further comprising an input unit, wherein said combining unit combines with respect to said same color on the basis of an input value of said input unit.

3. The image display of claim 2, further comprising a luminance computing unit computing a luminance of said image data, wherein said combining unit combines with respect to said same color on the basis of a luminance value computed by said luminance computing unit.

4. The image display of claim 2, further comprising a coordinate computing unit computing a color coordinate of said input image data, wherein said determining unit combines with respect to said same color on the basis of a coordinate value by said coordinate computing unit.

5. The image display of claim 2, further comprising an image tendency computing unit determining a tendency of at least one of a luminance distribution, a brightness distribution and a color distribution of said image from all the image data of the displayed image, wherein said combining unit combines with respect to said same color on the basis of a computed value of said image tendency computing unit.

6. The image display of claim 2, further comprising a setting unit determining an image data group corresponding to a divided image obtained by dividing a displayed image into regions comprising a predetermined magnitude, wherein said combining unit combines with respect to said same color on the basis of a set value of said setting unit in such a manner that the image data included in the image data group corresponding to said divided image has the same tendency.

7. The image display of claim 2, further comprising an inhibiting unit inhibiting said combining unit from including each of the specific data of said specific color computing unit in the combined data.

8. The image display of claim 1, further comprising an input unit, wherein said combining unit combines with respect to said same color on the basis of an input value of said input unit.

9. The image display of claim 1, further comprising a luminance computing unit computing a luminance of said image data, wherein said combining unit combines with respect to said same color on the basis of a luminance value computed by said luminance computing unit.

10. The image display of claim 9, further comprising a coordinate computing unit computing a color coordinate of said input image data, wherein said determining unit combines with respect to said same color on the basis of a coordinate value by said coordinate computing unit.

11. The image display of claim 9, further comprising a setting unit determining an image data group corresponding to a divided image obtained by dividing a displayed image into regions comprising a predetermined magnitude, wherein said combining unit combines with respect to said same color on the basis of a set value of said setting unit in such a manner that the image data included in the image data group corresponding to said divided image has the same tendency.

12. The image display of claim 9, further comprising an inhibiting unit inhibiting said combining unit from including each of the specific data of said specific color computing unit in the combined data.

13. The image display of claim 1, further comprising a luminance computing unit computing a luminance of said image data, wherein said combining unit combines with respect to said same color on the basis of a luminance value computed by said luminance computing unit.

14. The image display of claim 1, further comprising a coordinate computing unit computing a color coordinate of said input image data, wherein said determining unit combines with respect to said same color on the basis of a coordinate value by said coordinate computing unit.

15. The image display of claim 14, further comprising an image tendency computing unit determining a tendency of at least one of a luminance distribution, a brightness distribution and a color distribution of said image from all the image data of the displayed image, wherein said combining unit combines with respect to said same color on the basis of a computed value of said image tendency computing unit.

16. The image display of claim 14, further comprising a setting unit determining an image data group corresponding to a divided image obtained by dividing a displayed image into regions comprising a predetermined magnitude, wherein said combining unit combines with respect to said same color on the basis of a set value of said setting unit in such a manner that the image data included in the image data group corresponding to said divided image has the same tendency.

17. The image display of claim 14, further comprising an inhibiting unit inhibiting said combining unit from including each of the specific data of said specific color computing unit in the combined data.

18. The image display of claim 1, further comprising a coordinate computing unit computing a color coordinate of said input image data, wherein said determining unit combines with respect to said same color on the basis of a coordinate value by said coordinate computing unit.

19. The image display of claim 1, further comprising an image tendency computing unit determining a tendency of at least one of a luminance distribution, a brightness distribution and a color distribution of said image from all the image data of the displayed image, wherein said combining unit combines with respect to said same color on the basis of a computed value of said image tendency computing unit.

20. The image display of claim 19, further comprising a setting unit determining an image data group corresponding to a divided image obtained by dividing a displayed image into regions comprising a predetermined magnitude, wherein said combining unit combines with respect to said same color on the basis of a set value of said setting unit in such a manner that the image data included in the image data group corresponding to said divided image has the same tendency.

21. The image display of claim 19, further comprising an inhibiting unit inhibiting said combining unit from including each of the specific data of said specific color computing unit in the combined data.

22. The image display of claim 1, further comprising an image tendency computing unit determining a tendency of at least one of a luminance distribution, a brightness distribution and a color distribution of said image from all the image data of the displayed image, wherein said combining unit combines with respect to said same color on the basis of a computed value of said image tendency computing unit.

23. The image display of claim 1, further comprising an image tendency computing unit determining a tendency of at least one of a luminance distribution, a brightness distribution and a color distribution of said image from all the image data of the displayed image, wherein said combining unit combines with respect to said same color on the basis of a computed value of said image tendency computing unit.

24. The image display of claim 1, further comprising a setting unit determining an image data group corresponding to a divided image obtained by dividing a displayed image into regions comprising a predetermined magnitude, wherein said combining unit combines with respect to said same color on the basis of a set value of said setting unit in such a manner that the image data included in the image data group corresponding to said divided image has the same tendency.

25. The image display of claim 24, further comprising an inhibiting unit inhibiting said combining unit from including each of the specific data of said specific color computing unit in the combined data.

26. The image display of claim 1, further comprising a setting unit determining an image data group corresponding to a divided image obtained by dividing a displayed image into regions comprising a predetermined magnitude, wherein said combining unit combines with respect to said same color on the basis of a set value of said setting unit in such a manner that the image data included in the image data group corresponding to said divided image has the same tendency.

27. The image display of claim 1, further comprising an inhibiting unit inhibiting said combining unit from including each of the specific data of said specific color computing unit in the combined data.

* * * * *